United States Patent
Robichaux et al.

(10) Patent No.: US 8,631,540 B2
(45) Date of Patent: Jan. 21, 2014

(54) CANISTER ATTACHMENT FOR LEAF BLOWERS/VACUUMS

(71) Applicants: Jerry Robichaux, Tucson, AZ (US); Nurcan Robichaux, Tucson, AZ (US)

(72) Inventors: Jerry Robichaux, Tucson, AZ (US); Nurcan Robichaux, Tucson, AZ (US)

( * ) Notice: Subject to any disclaimer, the term of this patent is extended or adjusted under 35 U.S.C. 154(b) by 0 days.

(21) Appl. No.: 13/663,646

(22) Filed: Oct. 30, 2012

(65) Prior Publication Data

US 2013/0205536 A1    Aug. 15, 2013

Related U.S. Application Data

(60) Provisional application No. 61/597,464, filed on Feb. 10, 2012.

(51) Int. Cl.
*A47L 5/14*    (2006.01)

(52) U.S. Cl.
USPC .............. 15/345; 15/329; 15/339; 15/405; 15/352; 15/246.4

(58) Field of Classification Search
USPC ......... 15/328, 329, 339, 345, 352, 246.4, 405
IPC .......................................... A47I 5/14
See application file for complete search history.

(56) References Cited

U.S. PATENT DOCUMENTS

| | | | |
|---|---|---|---|
| 4,478,448 A | 10/1984 | Albert | |
| 4,713,858 A | 12/1987 | Kelber | |
| 5,054,159 A | 10/1991 | Richardson | |
| 5,294,063 A * | 3/1994 | Bote | 241/101.78 |
| 5,661,873 A | 9/1997 | Karet | |
| 5,771,531 A | 6/1998 | Swartz | |
| 6,226,833 B1 * | 5/2001 | Kawaguchi et al. | 15/405 |
| 6,280,532 B1 * | 8/2001 | Allen | 134/21 |
| 6,618,898 B2 | 9/2003 | Tingle | |
| 6,766,560 B2 | 7/2004 | Murphy | |
| 7,003,846 B2 | 2/2006 | Holtz | |
| 7,077,172 B2 | 7/2006 | Perkitny et al. | |
| 7,404,230 B1 | 7/2008 | Phillips | |
| 7,984,530 B2 | 7/2011 | Reynolds et al. | |

* cited by examiner

*Primary Examiner* — David Redding
(74) *Attorney, Agent, or Firm* — Sinorica, LLC

(57) ABSTRACT

A canister attachment for leaf blowers/vacuums is an apparatus that attaches to existing yard waste leaf blower/vacuum's to provide a user with a facilitated means to collect solid animal waste or other debris deposited on the ground. The apparatus comprises a suction nozzle assembly, a canister, a suction duct, a support assembly, and a leaf blower/vacuum. The suction nozzle assembly comprises a canister mount and a nozzle. The canister comprises a nozzle mount, a lateral surface, a filter plate, a duct opening, and a first and second chamber. The suction duct comprises a duct canister mount, a channel, and a leaf blower/vacuum mount. The configuration of these components provides the user with a mobile accessory that utilizes the suction from existing conventional leaf blowers/vacuums to siphon animal waste through the nozzle and into the canister. Furthermore, the apparatus provides an exhaust catch to prevent accidental discharge through the leaf blower/vacuum.

22 Claims, 13 Drawing Sheets

CANISTER ATTACHMENT FOR LEAF BLOWERS/VACUUMS

The current application claims a priority to the U.S. Provisional Patent application Ser. No. 61/597,464 filed on Feb. 10, 2012.

FIELD OF THE INVENTION

The present invention relates generally to a yard waste leaf blower vacuum attachment. More particularly to a collection device that attaches to existing yard waste leaf blower/vacuum's to provide a user with a facilitated means to collect solid animal waste deposited on the ground.

BACKGROUND OF THE INVENTION

Animal caretakers, grounds keepers, and pet owners must routinely clean up animal waste from animal enclosures, yards, and other various locations where an animal would leave their waste. For most responsible individuals, the cleaning of animal waste requires them to handle the solid animal matter with either a glove or a cumbersome apparatus. While either situation carries its own disadvantages compared to the other, both current methods are generally considered to be messy, unpleasant, and in some cases difficult. While the unpleasant job of handling animal waste is inescapable for responsible individuals, apparatuses have been designed and created to minimize the various negative aspects associated with cleaning up animal waste.

The apparatuses developed for cleaning up animal waste can be largely placed into two categories that are distinguished by the means in which they collect solid animal waste. The first category of apparatuses utilizes a non-mechanical means of collecting waste. These devices typically require the user to move the apparatus into position shovel the solid waste matter into the apparatus. The second category of apparatuses utilizes a mechanical component to siphon the animal waste into a receptacle. These types of device function similarly to vacuums. Prior art in U.S. Pat. Nos. 7,984,530, 6,618,898, 5,661,873, 7,003,846, 7,404,230, 5,771,531, 7,077,172, and 4,478,448 are systems for using suction to collect animal feces. These mechanical apparatuses function solely as a collection device for animal waste. While this aspect allows the apparatus to work well within its intended function, the specificity of the apparatus prevents the apparatus and its components from functioning in a capacity outside of their intended use, even if functionality or components overlap with other tasks. Additionally the specificity of these apparatuses results in some devices that are large and cumbersome. As a result these apparatuses can be difficult to use and store by users. This invention, describes an apparatus with unique features and components so that it can attach to a conventional leaf blower/vac system, for the purpose of collecting solid dog or solid pet waste, or excrement from mammals, also known as feces. This is a novel and unique approach, because it allows the consumer to purchase this invention as an attachment or accessory to a commercial off the shelf leaf blower/vacuum/mulcher product, one which the consumer may already own, and provide a superior method for collecting animal waste or various types of debris. This approach offers unique advantages to the consumer, as the need to purchase and maintain yet another motorized device, either gas or electric, is eliminated. Also eliminated is the need to store another bulky tool to perform the task, such as the device in U.S. Pat. No. 6,618,898. Creating an attachment device for a leaf blower/vacuum for the purpose of collecting animal waste, presents the same advantages of the patented multi use yard tools and innovative attachment devices that can be found in the prior art of granted US patents. In the Prior art, there are several examples of US patents granted to inventors who try to extend the applications of conventional leaf blowers. One such example is U.S. Pat. No. 6,766,560 which describes a Gutter Leaf-Blower apparatus that attaches an air nozzle on one end of a small lightweight, 6-8 foot rigid tube assembly and, in turn, connecting the input of the air nozzle to the output of an air blower with a flexible air hose. Another U.S. Pat. No. 5,054,159 describes a trash loosening brush kit attachment for the purpose of debris removal using a power blower, or leaf blower. Another such example is U.S. Pat. No. 4,713,858, Kelber Dec. 22, 1987, which describes a Leaf collection apparatus for blower-vacuums. In this invention a leaf collection apparatus is attached to a blower/vacuum. This device is an accessory that can be purchased for many of today's leaf blower/vacuum/mulcher systems.

The intent of this invention is to provide another function to a leaf blower/vacuum system, animal waste removal, with the addition of a specially designed attachment that addresses the risks and takes advantage of the unique features of a common leaf/blower/vac system.

This approach of creating a leaf blower/vacuum system attachment to collect animal waste will also allow manufactures of said off the shelf blower/vacuum/mulcher products to offer this product as an accessory to the product they already manufacture.

This invention was designed so that it would not require modifications to the blower/vacuum/mulcher product, in order to perform this function, and not do any harm to the blower/vacuum/mulcher in the process, nor cause an additional safety hazard to the user, nor require any complex tools or processes to attach and use the invention. The net benefit of this approach, is that a powerful, widely available, and low cost leaf blower vacuum/mulchers may be used with this attachment invention to provide additional function of collecting solid animal waste. This provides a more practical solution than the devices referenced in the prior art, all of which are basically stand alone vacuum systems with a built in vacuum source. In U.S. Pat. No. 5,661,873, the author claims blower/vacuum devices will not work for the collection of animal waste because: "Waste is sucked into the machine via the intake tube, across the impeller and out the blower end and into the bag. These types of machines will not work as animal waste vacuums as the waste and debris is smashed and crushed when it rams into the impeller or cut by a mulching blade and this would make a severe mess and clog up the machine." What is obvious is that waste cannot be ground up and ejected from the machine at the typical exit velocities of leaf blower vacuums of 100 to 240 miles per hour. Also important is that the waste capture method must be resistant to the high vacuum that typical leaf blower/vacuum/mulcher products can produce without excessively clogging. As stated, there are many low cost, unique and novel features present in the scope of this invention that allows the conventional leaf/blower/mulcher to be utilized. These features will be detailed in the following sections.

It is therefore the object of the present invention to provide an accessory attachment for existing leaf blower/vacuums that offer a user a facilitated means to collect animal waste. The present invention accomplishes this through the uses of a mobile collection chamber designed for collecting animal matter of various consistencies powered by the suction created by an existing leaf blower/vacuum that attaches to an interchangeable mounting point.

DETAIL DESCRIPTIONS OF THE INVENTION

All illustrations of the drawings are for the purpose of describing selected versions of the present invention and are not intended to limit the scope of the present invention.

Figure 1:
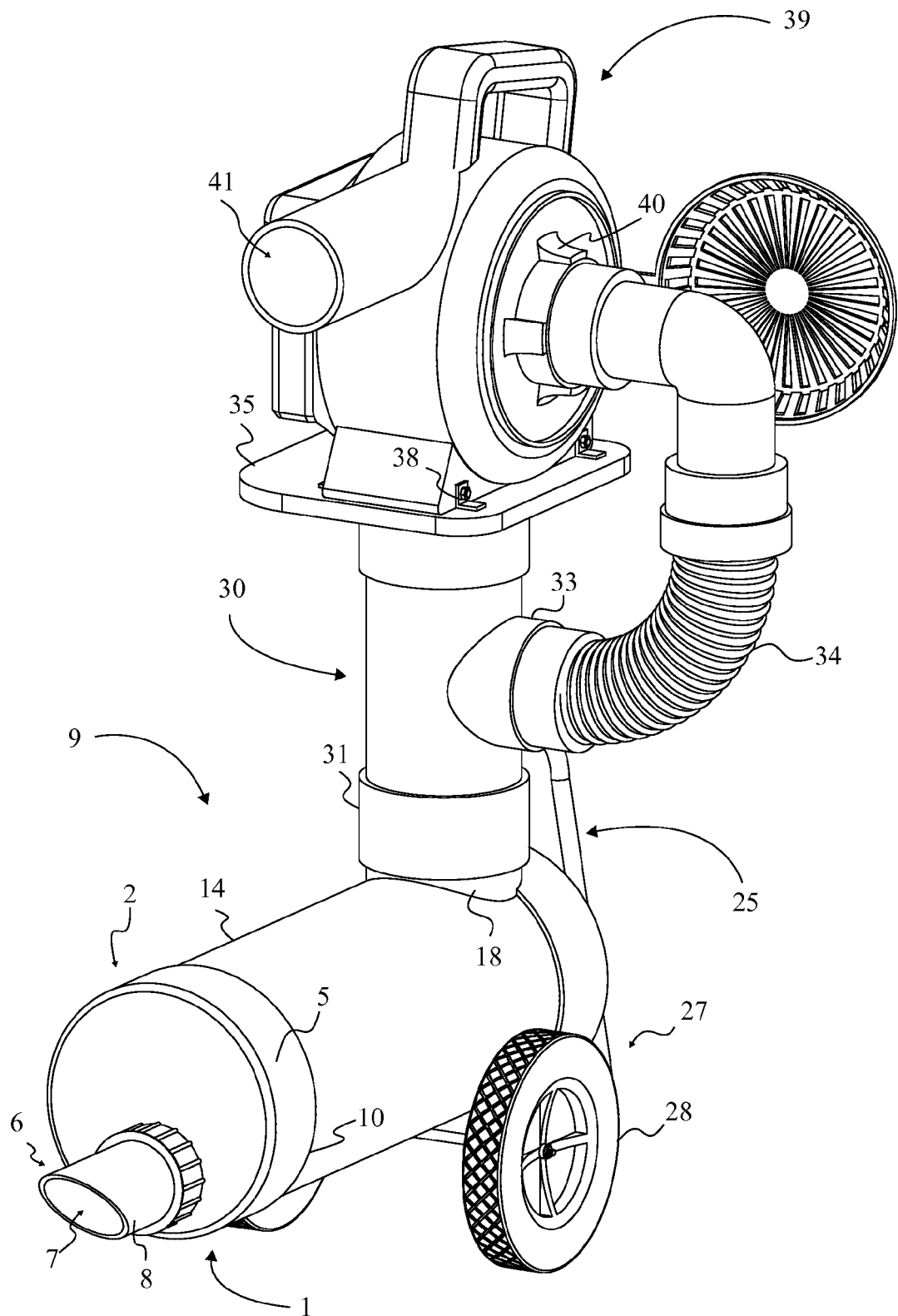
FIG. 1 is a perspective view of the current embodiment of the present invention displaying the canister sleeve, the flexible duct, and a wheel and axel assembly configuration.
Figure 2:
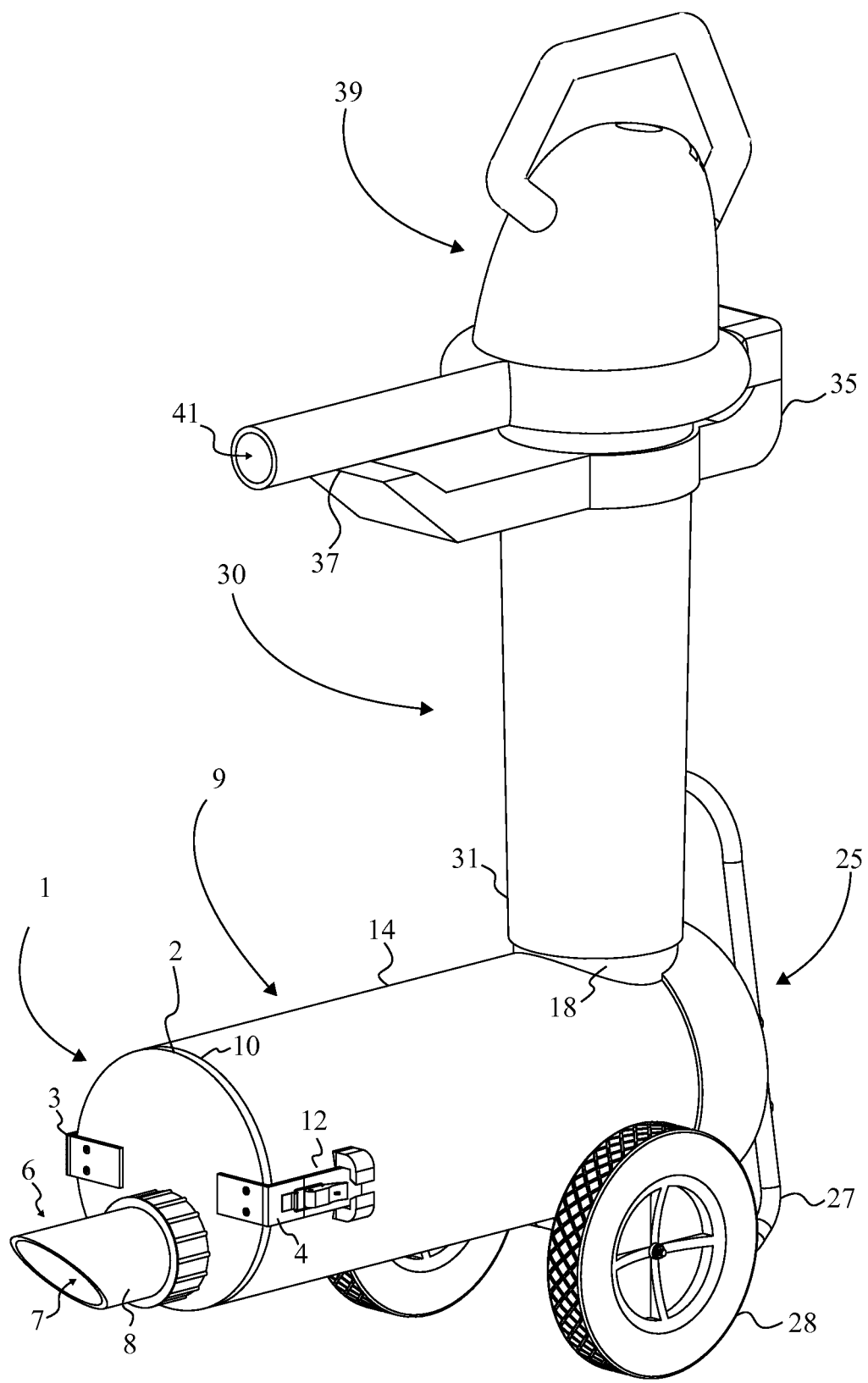
FIG. 2 is a perspective view of the current embodiment of the present invention displaying the latching configuration that utilizes shaped structural features to secure the leaf blower in place.

Referencing FIG. 1 and FIG. 2, the present invention is an accessory attachment for existing leaf blowers/vacuums 39 that provides a user with a facilitated means for collecting animal waste from a yard, animal enclosure, or any area where an animal could potentially leave their solid waste. The canister attachment for leaf blowers/vacuums accomplishes this through the use of a mobile receptacle that siphons the waste matter of various animals into a receptacle that is easily cleaned and stored after use. The apparatus provides the user with the ability to add additional functionality to their existing leaf blowers/vacuums 39, while reducing the need for a singular function piece of equipment that would take additional space and provide little functionality outside of its intended use. The canister attachment for leaf blowers/vacuums comprises a suction nozzle assembly 1, a canister 9, a vertical support assembly 25, a suction duct 30, and a leaf blower/vacuum 39. The suction nozzle assembly 1 is found coupled adjacent to the canister 9. The suction nozzle assembly 1 functions as the siphoning point for the animal waste. The canister 9 functions as the receptacle in which the animal waste is siphoned into. The vertical support assembly 25 is found being coupled adjacent to the canister 9. The vertical support assembly 25 serves as a structural component that provides a means for vertical upright support and improves the mobility of the canister 9 and resultantly of the apparatus. The suction duct 30 is found positioned between the leaf blower and the canister 9. The suction duct 30 provides the leaf blower/vacuum 39 with an air flow channel between the leaf blower/vacuum 39 and the canister 9.

Figure 3:
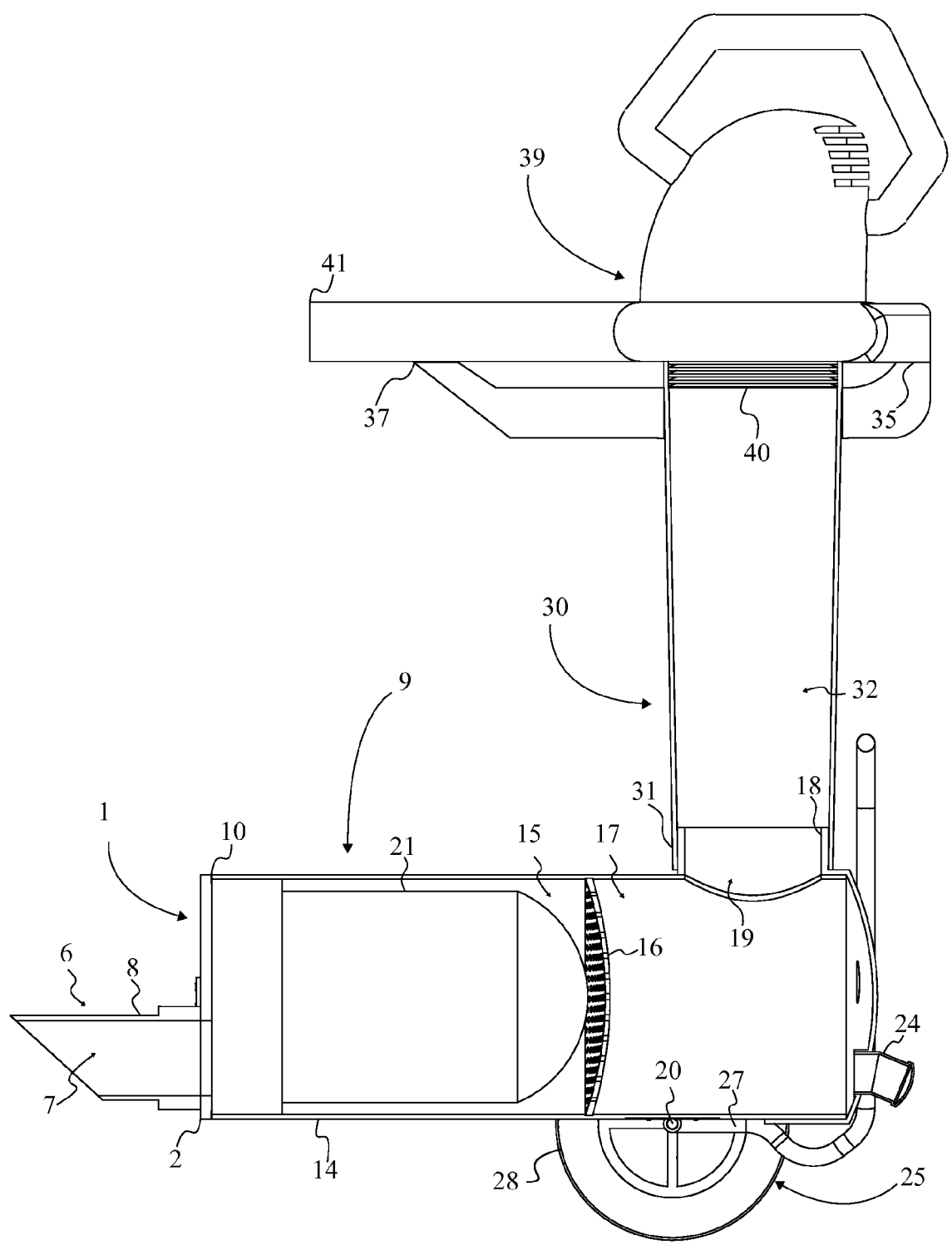
FIG. 3 is a cross sectional view of the current embodiment of the present invention displaying the interior portions of the suction nozzle assembly, canister, vertical support assembly, suction duct, and leaf blower/vacuum.
Figure 4:
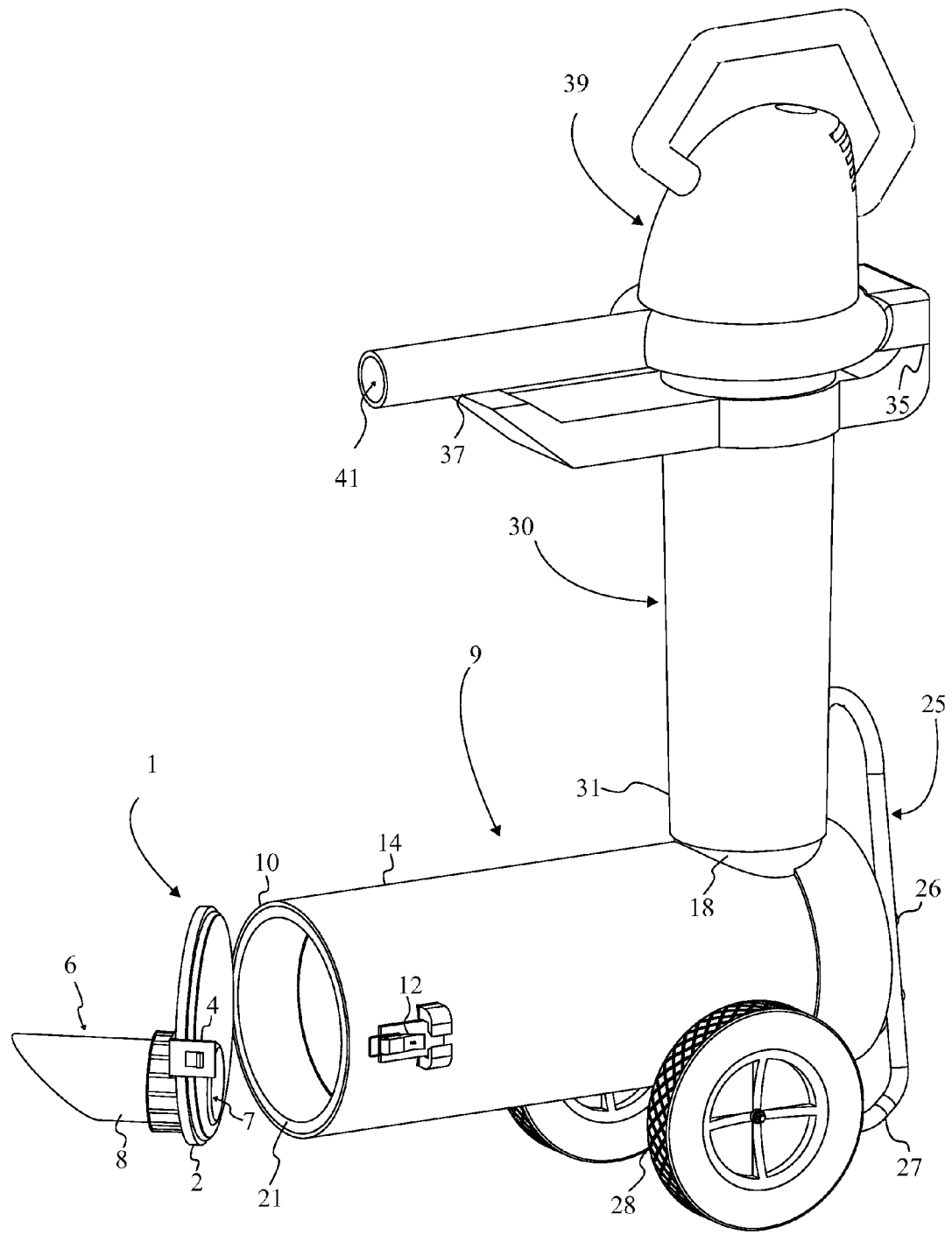
FIG. 4 is a perspective view of the current embodiment of the present invention displaying the suction nozzle assembly in an uncoupled state with the canister.

Referencing FIG. 3 and FIG. 4, the suction nozzle assembly 1 of the present invention functions as the point of aspiration for the animal waste. The suction nozzle assembly 1 provides the present invention with the ability to direct the suctioning provided by the leaf blower/vacuum 39 towards various pieces of animal waste in an effective manner. The suction nozzle assembly 1 is found being coupled adjacent to the canister 9. The suction nozzle assembly 1 comprises a nozzle 6 and a nozzle canister mount 2. The nozzle 6 comprises a nozzle channel 7 and a visual indicator 8. The nozzle 6 is the flow control opening that directs the suctioning from the apparatus in the direction of the animal waste. The nozzle channel 7 traverses through the nozzle 6 and into the canister 9. The nozzle channel 7 serves as the passage in which animal waste must travel before reaching the interior of the canister 9. The opening of the nozzle channel 7 is also tapered to provide an opening that is angled at 45° degrees to facilitate the collection of matter. The visual indicator 8 is found operatively coupled with the nozzle channel 7. The visual indicator 8 provides the user with information regarding the transit of matter through the nozzle channel 7. The nozzle 6 utilizes transparent materials that allow the user to visually determine if the animal matter has been siphoned into the canister 9.

Referencing FIG. 3, in the present invention the suction nozzle assembly 1 is found coupled adjacent to the canister 9, more specifically the suction nozzle canister mount 2 is engaged to a suction nozzle mount 10, wherein the connection between the suction nozzle assembly 1 and the canister 9 forms an air tight seal. While this is the preferred embodiment of the present invention, the relationship described between the suction nozzle assembly 1 and the canister 9 are further described in two configurations which further described the component orientations. The first configuration comprises a latching system that allows the suction nozzle assembly 1 to pivotally attach to the canister 9 and be latched securely in place. The second configuration utilizes a concave cap which sleeves over the lateral surface 14 of the canister 9 while providing an air tight seal.

Figure 5:
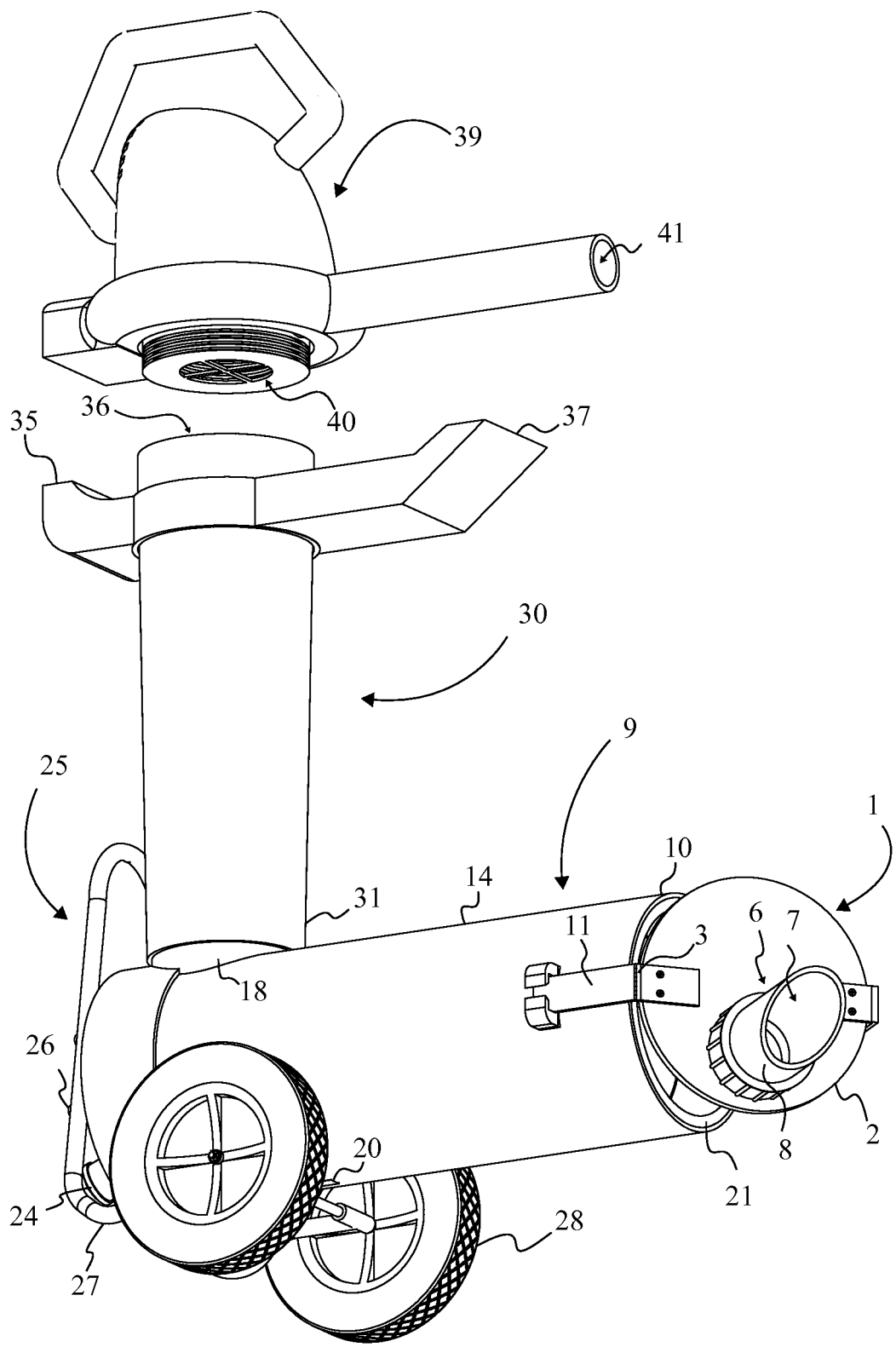
FIG. 5 is a bottom perspective view of the current embodiment of the present invention displaying the suction nozzle assembly in an uncoupled state with the canister, as well as the leaf blower/vacuum in an uncoupled state.

Referencing FIG. 4 and FIG. 5, in the latching configuration for the present invention, the nozzle canister mount 2 comprises a nozzle hinge 3 and a nozzle latch 4. The suction nozzle mount 10 comprises a canister hinge 11 and a canister latch 12. The nozzle canister mount 2 is positioned adjacent to the suction nozzle mount 10. The nozzle canister mount 2 provides the suction nozzle assembly 1 with an attachment point for connecting to the canister 9. The nozzle hinge 3 is pivotally engaged to the canister hinge 11. The nozzle hinge 3 provides the nozzle canister mount 2 with a means to pivot about the connection with the canister hinge 11. The pivot of the suction nozzle assembly 1 aligns the nozzle latch 4 with the canister latch 12. The canister latch 12 and the nozzle latch 4 functions as complementary components which are engage to securely lock the suction nozzle assembly 1 against the canister 9. The connection between the nozzle latch 4 and the canister latch 12 provides suction nozzle assembly 1 with an air tight seal during use. The nozzle hinge 3 and the canister hinge 11 provides the present invention with a means to keep the suction nozzle assembly 1 attached to the canister 9 while providing access to the interior of the canister 9.

Figure 8:
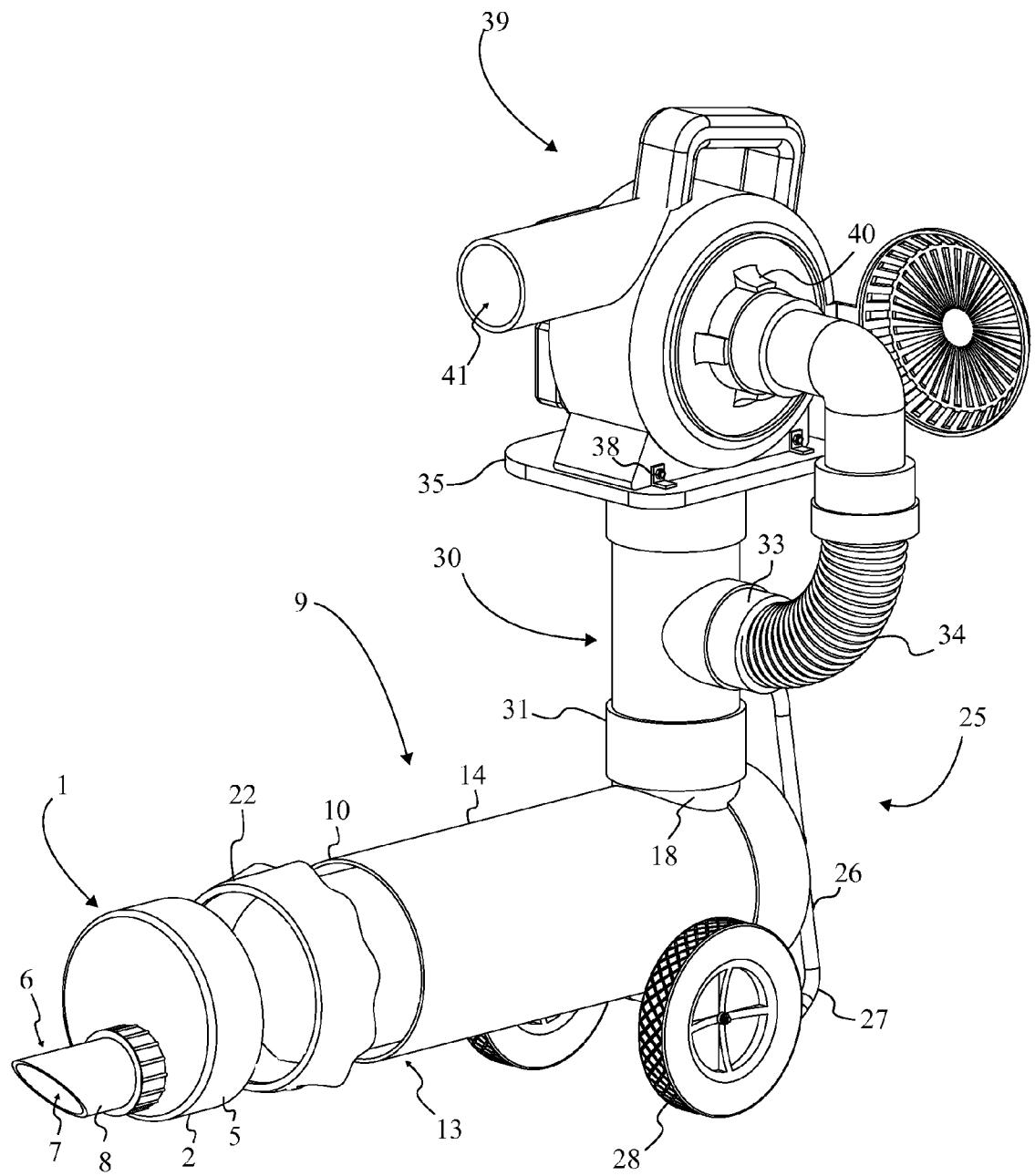
FIG. 8 is an expanded view of the current embodiment of the present invention displaying the removable matter collection receptacle configured as an air permeable bag, in an expanded state relative to the apparatus.

Referencing FIG. 8, in the concave cap configuration of the present invention, the nozzle canister mount 2 comprises a canister sleeve 5. The suction nozzle mount 10 comprises a sleeve mount 13. The nozzle canister mount 2 is positioned adjacent to the suction nozzle mount 10. The nozzle canister mount 2 provides the suction nozzle assembly 1 with an attachment point for connecting to the canister 9. In the concave cap configuration the sleeve mount 13 is concentric to the canister sleeve 5. The canister sleeve 5 is encircles the sleeve mount 13 and extends over the immediate area of the lateral surface 14 next to the sleeve mount 13. The canister sleeve 5 is constructed in a manner that provides its inner diameter to snugly fit over the sleeve mount 13 forming an air tight seal.

Referencing FIG. 3, the canister 9 serves as the attachment point for the suction nozzle assembly 1, the suction duct 30, and the vertical support assembly 25. The canister 9 functions as a receptacle that holds the siphoned animal waste during use. In the present invention the canister 9 comprises a suction nozzle mount 10, a lateral surface 14, a first chamber 15, a filter plate 16, a second chamber 17, a suction duct mount 18, a duct opening 19, and at least one vertical support mount 20. The suction nozzle mount 10 is positioned adjacent to the first chamber 15. The suction nozzle mount 10 serves as the attachment point for the nozzle canister mount 2 of the suction nozzle assembly 1. The suction nozzle mount 10 is coincident with the lateral surface 14. The first chamber 15, the filter plate 16, and the second chamber 17 are found encircled by the lateral surface 14. The lateral surface 14 serves as a mounting point for the various sub components of the canister 9. The filter plate 16 is found positioned collinearly between the first chamber 15 and the second chamber 17. The filter plate 16 is mounted on the interior of the lateral surface 14. The filter plate 16 partitions the interior of the canister 9 forming the first chamber 15 and the second chamber 17. The filter plate 16 serves as a barrier preventing suctioned matter or animal waste from first chamber 15 from traveling into the second chamber 17. The second chamber 17 is positioned adjacent to the filter plate 16 opposite to the first chamber 15. The second chamber 17 functions as the internal portion of the canister 9 in which air pressure is allowed to build providing improved flow between the first chamber 15 and the second chamber 17. The duct opening 19 is found traversing through the lateral surface 14 and into the second chamber 17. The duct opening 19 functions as a flow opening that aligns with the duct channel 32 of the suction duct 30. The suction duct mount 18 is found connected to the lateral surface 14, but is found coincident with the duct opening 19. The suction duct mount 18 provides the attachment point between the canister 9 and the suction duct 30, by way of the duct canister mount 31. The suction duct mount 18 provides a sealed connection with the duct canister mount 31, preventing unwanted leaks that can potentially lower air flow collection from the nozzle assembly. At least one vertical support mount 20 is found positioned on the lateral surface 14 on the exterior of the canister 9. At least one vertical support mount 20 provides a coupling point for the vertical support assembly 25.

Figure 9:
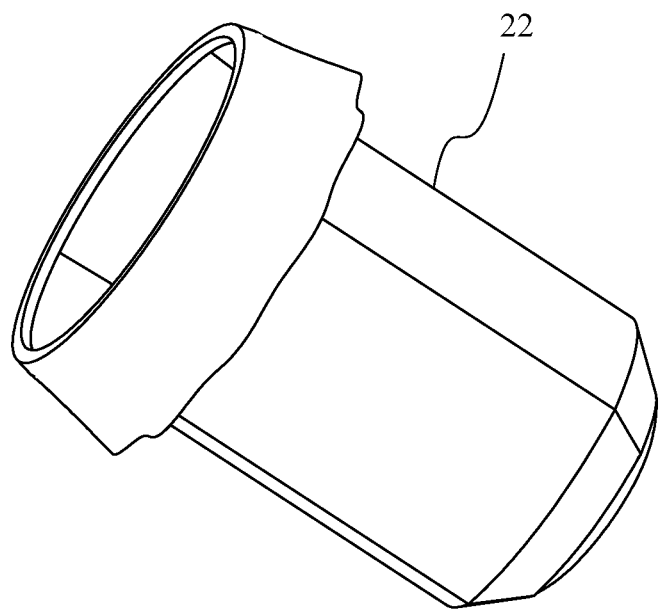
FIG. 9 is a perspective view of the removable matter collection receptacle configures as an air permeable bag as per the current embodiment of ht present invention.

Referencing FIG. 3, in the present invention the first chamber 15 is positioned adjacent to the filter plate 16, opposite to the second chamber 17. The first chamber 15 is found positioned adjacent to the suction nozzle mount 10. The first chamber 15 functions as the primary chamber in which animal waste is siphoned into from the suction nozzle assembly 1. The present invention provides a removable matter collection receptacle 21 that is positioned within the first chamber 15. The removable matter collection receptacle 21 functions as a removable air permeable animal waste matter container that limits the contact of the animal waste matter with the first chamber 15. The removable matter collection receptacle 21 provides sufficient air flow to allow for suctioning of the animal waste matter but is strong enough to prevent solid animal waste from traversing the removable collection receptacle and into the first chamber 15. While the preferred embodiment of the present invention describes the removable matter collection receptacle 21 as an air permeable container found within the first chamber 15, the removable matter collection receptacle 21 can be provided in two distinct configurations which meet the described relationship and functions. Referencing FIG. 8 and FIG. 9, the first configuration of the removable matter collection receptacle 21 provides the component as an air permeable bag 22. Referencing FIG. 6 and FIG. 7, the second configuration of the removable matter collection receptacle 21 provides the component as an air permeable basket 23.

In the air permeable bag 22 configurations for the removable matter collection receptacle 21, the air permeable bag 22 is similar to the vacuum bags used by conventional vacuum cleaners. The air permeable bag 22 is constructed of material that allows for the component to be disposable or reusable. In the current embodiment of the present invention the air permeable bag 22 configuration of the removable matter collection receptacle 21 is held in place inside the first chamber 15 by being secured between the suction nozzle mount 10 and the nozzle canister mount 2.

Figure 7:
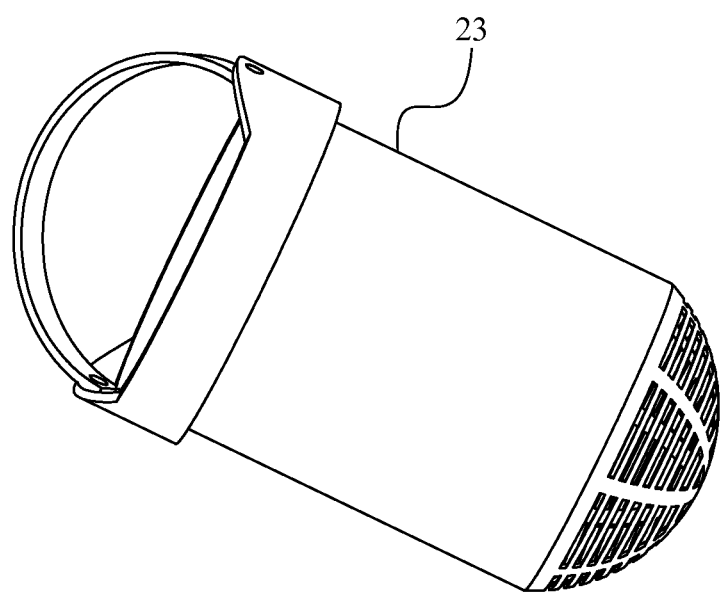
FIG. 7 is a perspective view of the removable matter collection receptacle configured as an air permeable basket as per the current embodiment of the present invention.

Referencing FIG. 7, the air permeable basket 23 is constructed from materials that provide the component with a rigid structure. The air permeable basket 23 is a reusable component. In current embodiment of the present invention the air permeable basket 23 configuration of the removable matter collection receptacle 21 is held in place by a mounting point found within the first chamber 15. Referencing FIG. 9, the removable matter collection receptacle 21, the air permeable bag 22 is similar to those currently used by conventional vacuum cleaners.

Figure 10:
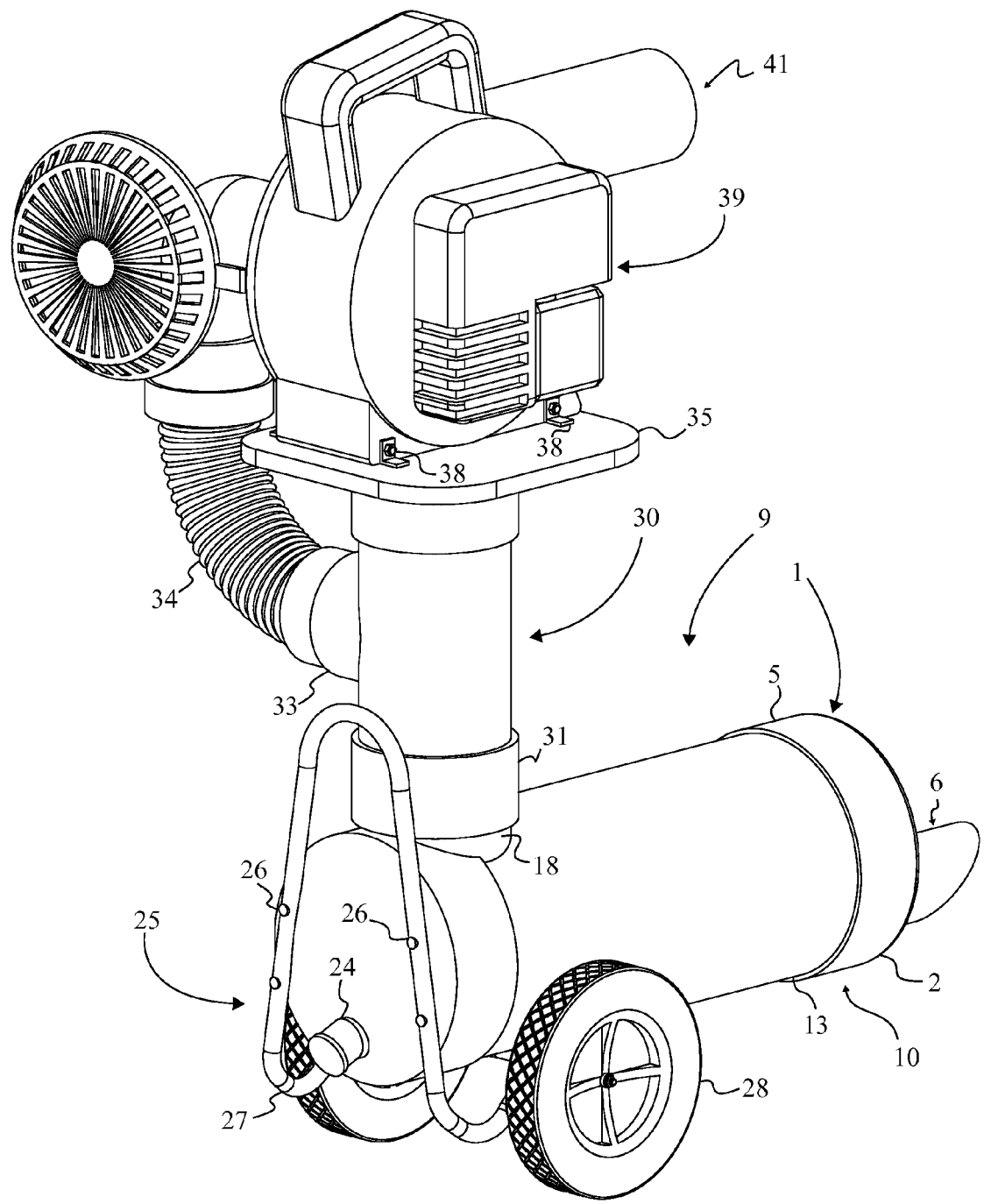
FIG. 10 is a rear perspective view of the current embodiment of the present invention displaying the canister attachment features of the vertical support mount and the drainage valve.
Figure 11:
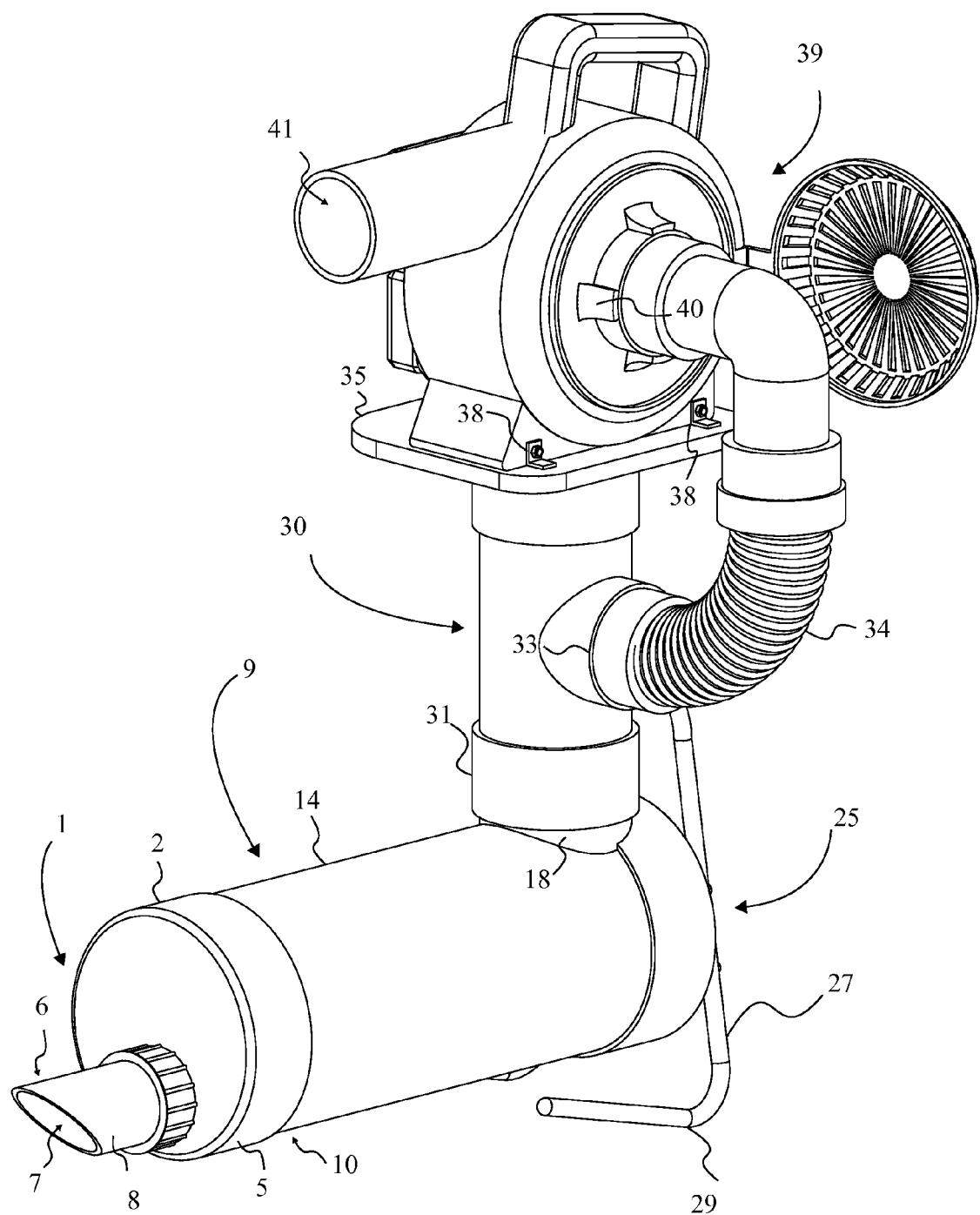
FIG. 11 is a perspective view of the current embodiment of the present invention displaying the ground contacting features of vertical support mount configured as a molded feature.

Referencing FIG. 10 and FIG. 11, the vertical support assembly 25 is found coupled adjacent to the canister 9. The vertical support assembly 25 provides the present invention with structural support but additionally functions as a means to rest the present invention on the ground. The preferred embodiment of the present invention, the vertical support assembly 25 comprises canister attachment features 26 and ground contacting features 27. The canister attachment features 26 used to couple the vertical support assembly 25 to the canister 9. The ground contacting features 27 as provided by the naming of the said component are the features of the vertical support assembly 25 that make contact with the ground. The ground contacting features 27 are found positioned below the canister 9. While the preferred embodiment of the present invention describes the ground contacting features 27 as the components that make contact with the ground and found below the canister 9, the ground contacting features 27 can be provided in two distinct configurations which meet the described relationship and function. The first configuration of the ground contacting features 27 provides the component as a wheel and axel assembly 28. The second configuration of the ground contacting features 27 provides the components as molded features 29.

Referencing FIG. 10, in the wheel and axel configuration of the ground contacting features 27, the wheel and axel assembly 28 provide the apparatus to have a wide range of motion in part due to the wheel and axel which traverse underneath the canister 9. The wheel and axel assembly 28 provides the apparatus with facilitated movement in a straight line while allowing for the apparatus to be rotated about an axis of the component. The wheel and axel assembly 28 provides the present invention with the ability to distribute the weight of the apparatus while in use and in motion.

Referencing FIG. 11, in the molded features 29 configuration of the ground contacting features 27, the molded features 29 serve as protrusions that extend from the vertical support assembly 25 towards the ground. The molded features 29 are specifically designed to engage the ground and provide the apparatus with a stable means to remain up right without support from a user.

Referencing FIG. 3, the suction duct 30 is positioned between the leaf blower/vacuum 39 and the canister 9. The suction duct 30 is hermetically coupled with the leaf blower/vacuum 39 and the canister 9. The suction duct 30 is found attached laterally to the canister 9 and positioned perpendicular to the suction nozzle assembly 1. The suction duct 30 comprises a duct canister mount 31, a duct channel 32, and a leaf blower/vacuum mount 35. The duct canister mount 31 is hermetically coupled to the suction duct mount 18. The duct canister mount 31 provides the attachment point for the suction duct 30 and the canister 9. The duct channel 32 is found traversing through the suction duct 30 and is perpendicular to the duct canister mount 31. The duct channel 32 is pointed to coincide with the duct opening 19 of the canister 9. The duct channel 32 serves as the passage where suctioned air traverses from the canister 9 to the air inlet 40 of the leaf blower/vacuum 39. The leaf blower/vacuum mount 35 serves as the attachment point between the suction duct 30 and the leaf blower/vacuum 39. While the suction duct 30 as described above is understood as the preferred embodiment of the present invention, the suction duct 30 provided with differing configurations that retain the same component orientation and function as the preferred embodiment but provide more specific the relationships between the air inlet 40 and the suction duct 30, as well as, the leaf blower/vacuum 39 and the leaf blower/vacuum mount 35 for the plurality of leaf blower/vacuum 39 configuration that are currently on the market. The two of the embodiments of the present invention are used to further describe the relationship between the air inlet 40 and the suction duct 30 of the most common leaf blower/vacuum 39 configurations. The first configuration is provided for leaf blower/vacuums 39 that have their air inlet 40 positioned underneath the leaf blower/vacuum 39. The second configuration is provided for leaf blower/vacuums 39 that have the air inlet 40 positioned around the leaf blower/vacuum 39 but not underneath.

Figure 6:
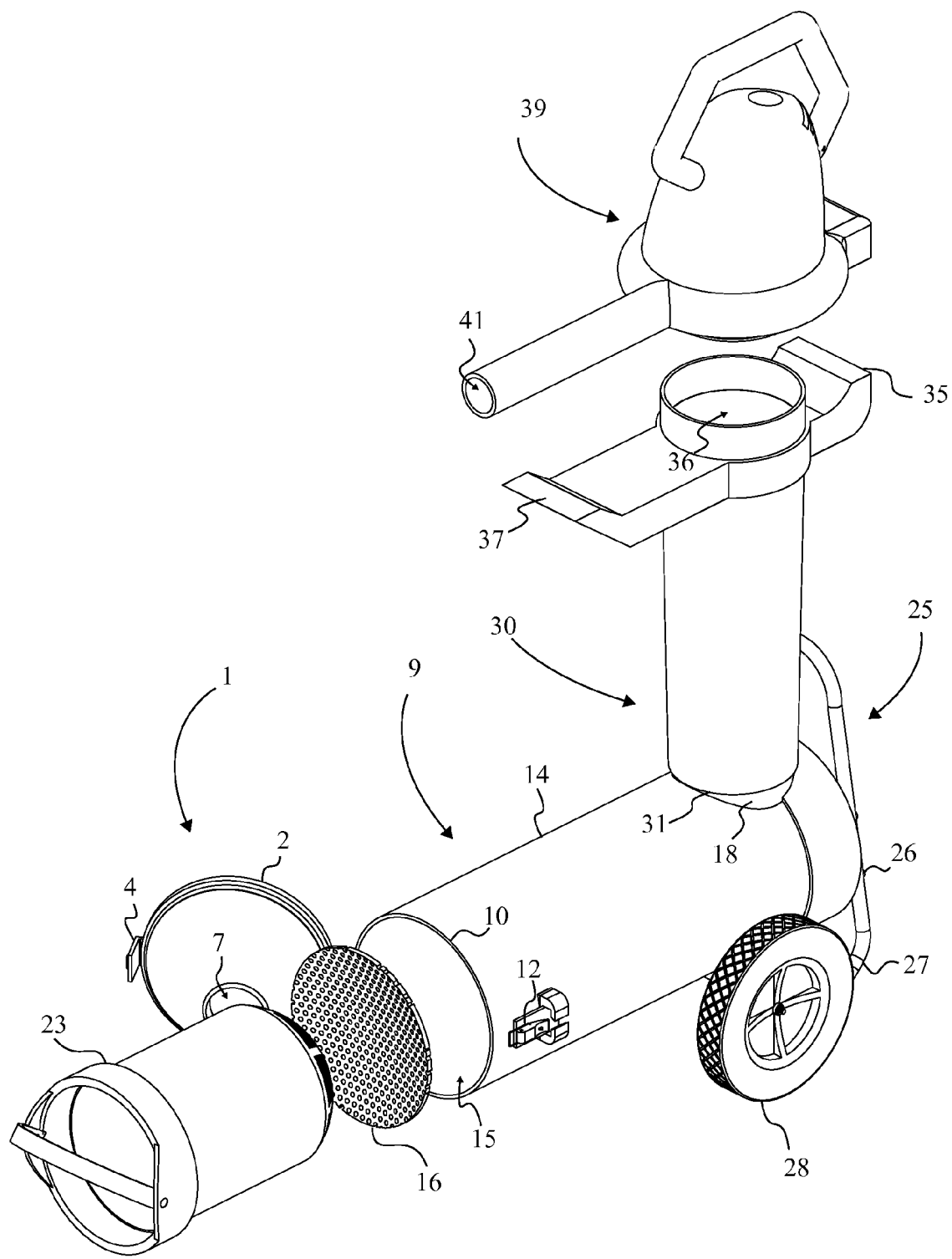
FIG. 6 is an expanded view of the current embodiment of the present invention displaying the removable matter collection receptacle configured as an air permeable basket, in an expanded state relative to the apparatus.

Referencing FIG. 5 and FIG. 6, the leaf blower/vacuum 39 configuration which provides the air inlet 40 underneath the leaf blower/vacuum 39 is accounted by including an air passage 36 to the leaf blower/vacuum mount 35. The additional air passage 36 traverses the through the mount and into the duct channel 32. The orientation of the air inlet 40 and air passage 36 causes the air inlet 40 to be coincident with the duct channel 32. This relationship is further improved by an air tight seal between the air passage 36 and the air inlet 40.

Referencing FIG. 1 and FIG. 10, the leaf blower/vacuum 39 configuration which provides the air inlet 40 positioned around the leaf blower/vacuum 39 and not underneath is accounted for by including a flexible duct assembly 34 and a flexible duct mount 33 to the suction duct 30. The flexible duct mount 33 is positioned between the leaf blower/vacuum mount 35 and the duct canister mount 31. The flexible duct mount 33 traverses the exterior of the suction duct 30 until becoming coincident with the duct channel 32. To provide appropriate suction the flexible duct assembly 34 is hermetically coupled to both the flexible duct mount 33 and to the air inlet 40, wherein the flexible duct mount 33 is coupled to the flexible duct assembly 34 opposite the air inlet 40 along the flexible duct assembly 34. The flexible duct assembly 34 as viewed in the FIG. 1 and FIG. 10 comprises a flexible duct, a plurality of couplers, and an angled duct. The flexible duct assembly 34 utilizes the couplers to create an air tight seal with the flexible duct mount 33 and the air inlet 40. While this is the preferred embodiment of the present invention it should be noted that the flexibly duct assembly 34 may comprises just the flexibly duct and the joining couplers which would be able provide the assembly the present invention with the same flexibility to join with the air inlet 40.

The additional two embodiments of the present invention are used to further describe the attachment used to secure the leaf blower/vacuum 39 to the leaf blower/vacuum mount 35. The first configuration utilizes shaped structural features 37 for the leaf blower/vacuum mount 35. The second configuration utilizes hardware fasteners 38 for the leaf blower/vacuum mount 35.

Referencing FIG. 5 and FIG. 6, the configuration that utilizes shaped structural features 37 provides the leaf blower/vacuum mount 35 with the ability secure the leaf blower/vacuum 39 to the leaf blower/vacuum mount 35 through the use of specific couplings molded from the leaf blower/vacuum mount 35. Molded portions provide the leaf blower/vacuum mount 35 with the ability to attach the leaf blower/vacuum 39 without the need of any tools.

Referencing FIG. 10 and FIG. 11, the configuration that utilizes hardware fasteners 38 provides the leaf blower/vacuum mount 35 with hardware fasteners 38 to secure the leaf blower/vacuum 39 to the leaf blower/vacuum mount 35. The hardware fasteners 38 utilize available attachment points of the leaf blower/vacuum 39. The hardware fasteners 38 provide a connection method that typically requires tools which sacrifices convenience but provides a more secure attachment method for the leaf blower/vacuum 39 having a horizontal air inlet 40 configuration.

Referencing FIG. 1-3, the leaf blower/vacuum 39 serves as the aspirating device that provides the present invention with the ability to siphon animal matter into the canister 9. The leaf blower/vacuum 39 in the present invention comprises an air inlet 40 and an exhaust opening 41. The air inlet 40 serves siphoning point for the leaf blower/vacuum 39. The air inlet 40 is found coincident with the duct channel 32. The exhaust opening 41 is operatively positioned opposite to the air inlet 40. Air that is siphoned by the air inlet 40 traverses through the leaf blower/vacuum 39 and is then expelled through the exhaust opening 41.

Referencing FIG. 3, the orientation of the above mentioned components provides the present invention with the ability to suction animal waste matter into the canister 9. Initially a user would need to ensure the proper positioning prior to initiating the apparatus. The user would be able to accomplish this checking and securing the suction nozzle assembly 1 to the canister 9 and then checking the coupling of the leaf blower/vacuum 39 with the suction duct 30. The user would ensure that the attachment method utilized creates an air tight seal around the air inlet 40 and that the air inlet 40 is coincident with the duct channel 32. After which, the user would check that leaf blower/vacuum 39 is securely attached with the leaf blower/vacuum mount 35. After checking the vital connections the user would activate the leaf blower/vacuum 39. The leaf blower/vacuum 39 would create suction within the apparatus from the air inlet 40. Suction from the air inlet 40 would cause negative pressure to accumulate within the duct channel 32. The negative pressure would build in the suction duct 30, then the second chamber 17, and then first chamber 15. This negative pressure causes the nozzle 6 to siphon animal waste through the nozzle channel 7 to be collected within the first chamber 15. With the leaf blower/vacuum 39 activated the user would utilize the handle of the leaf blower/vacuum 39 to direct and control the path of apparatus. The apparatus would be directed until a piece of animal waste is found. With the apparatus oriented towards the animal waste, the nozzle 6 would be positioned in a manner to align nozzle channel 7 with the animal waste. The animal waste matter would then traverse the nozzle 6 by way of the nozzle channel 7 into the first chamber 15. The user would be able to know when the apparatus had finished suctioning the animal waste into the canister 9 by a visual cue provided by the visual indicator 8. The animal waste would be suctioned into the removable matter collection receptacle 21 of the first chamber 15. The siphoned air that pulled the animal matter into the removable matter collection receptacle 21 would traverse the removable matter collection receptacle 21 into the first chamber 15. The siphoned air would then traverse the filter plate 16 into the second chamber 17. After which the siphoned air would traverse the duct opening 19 and into the duct channel 32. At which point the siphoned air would then travel into the leaf blower/vacuum 39 by way of the suction opening. Finally, the siphoned air would be expelled from the leaf blower/vacuum 39 by way of the exhaust opening 41.

Figure 12:
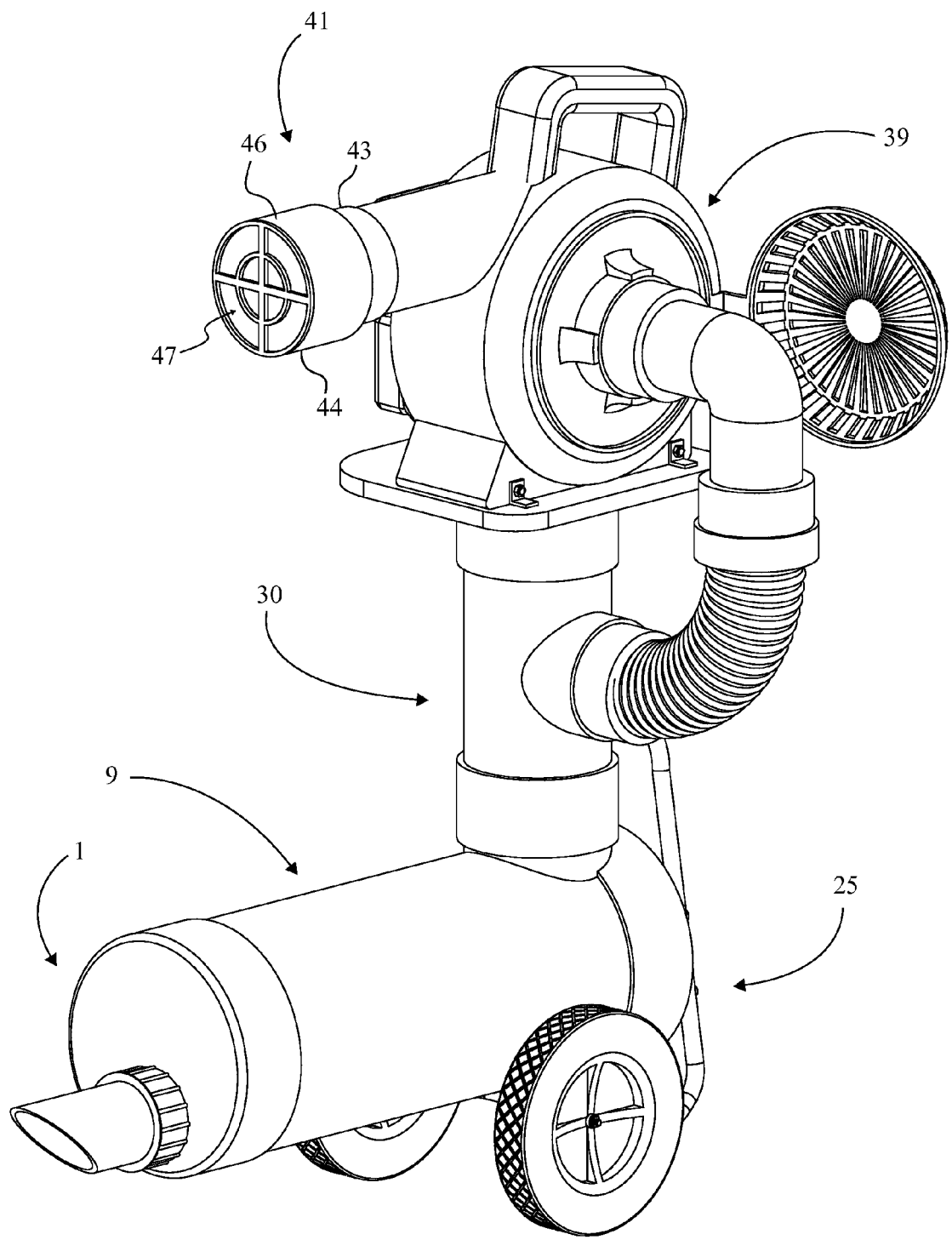
FIG. 12 is a perspective view of the current embodiment of the present invention displaying the exhaust catch as an air permeable filter housing.
Figure 13:
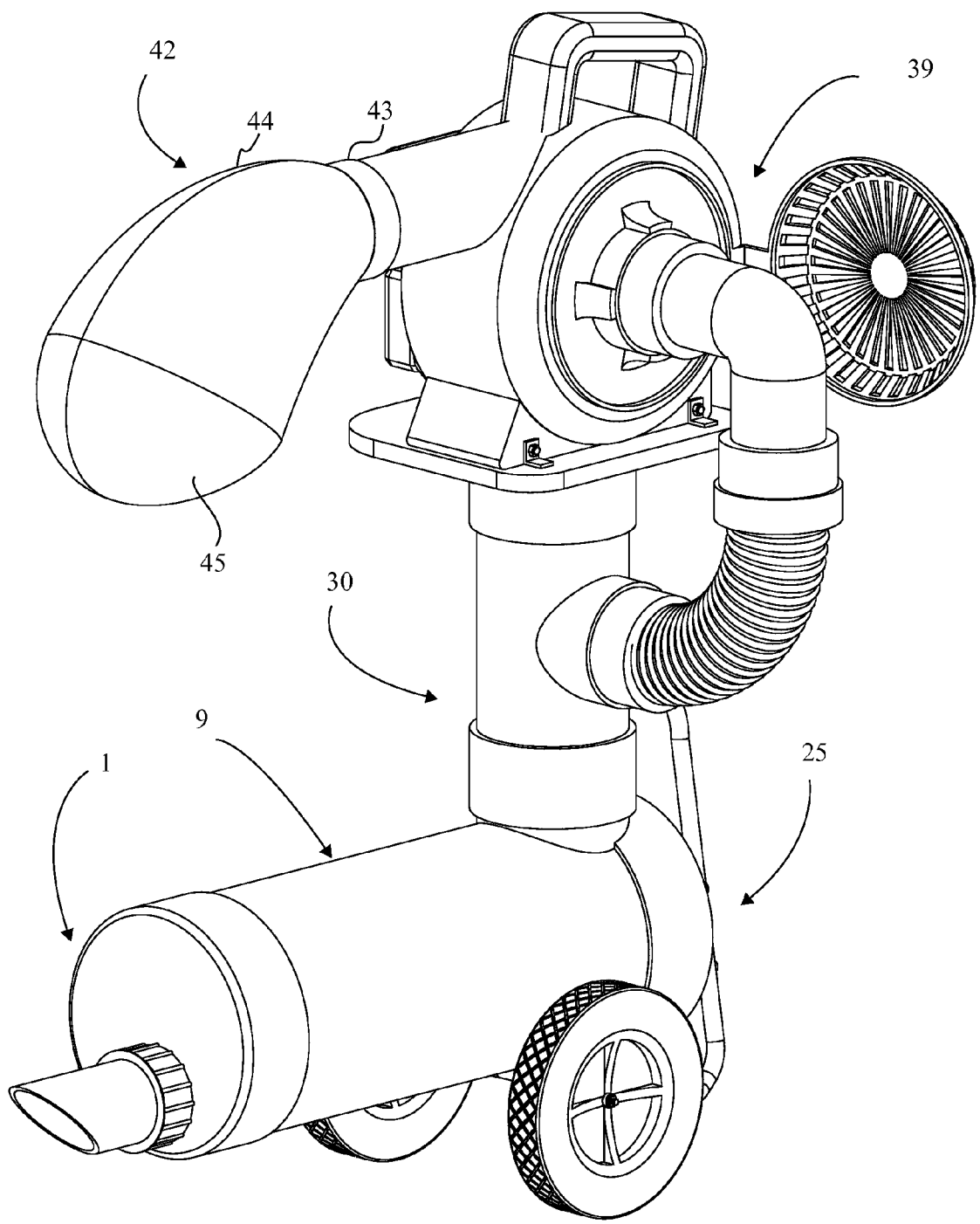
FIG. 13 is a perspective view of the current embodiment of the present invention displaying the exhaust catch as an air permeable fabric forming bag.

Referencing FIG. 12 and FIG. 13, the preferred embodiment of the present invention additionally includes a component that provides a final barrier to prevent particulate or large solid matter from being rapidly expelled from the exhaust opening 41. To accomplish this, the present invention offers an exhaust catch 42 that can be attached to the exhaust opening 41 of the leaf blower/vacuum 39. The exhaust catch 42 serves as final safety barrier that prevents matter that is siphoned through the apparatus from causing harm upon being ejected. There are various configurations available for the exhaust catch 42. Fundamentally, the exhaust catch 42 is an assembly that comprises an exhaust catch mount 43 that allows it to securely attach to the exhaust opening 41 and an air permeable barrier 44 which catches solid waste matter expelled from the exhaust opening 41. The various configurations differ in the implementation of the air permeable barrier 44 in relation to the exhaust catch mount 43. In the second configuration the air permeable barrier 44 is configured as an air permeable fabric forming bag 45. The air permeable fabric forming bag 45 is mounted by the exhaust catch mount 43 and allows the passage of air while blocking solid matter from traversing through. The first configuration of the air permeable barrier 44 is an air permeable filter housing 46. The air permeable filter housing 46 is mounted to the exhaust catch mount 43 utilizes a filter medium 47 positioned internally or externally, to prevent solid matter from traversing through it. Additionally the filter medium 47 is configured as either an air permeable grid element or an air permeable pleated filter.

Referencing FIG. 10, the present invention includes an additional component that provides facilitated cleaning of the interior of the canister 9. The additional component is a drainage valve 24. The drainage valve 24 is positioned adjacent to the second chamber 17. The drainage valve 24 provides the apparatus with a facilitated means of cleaning the interior of the canister 9 by removing fluids or fine particulates of matter that may collect within the canister 9 during use. The drainage valve 24 comprises of a removable seal that interfaces to a drainage opening on the canister 9. To utilize the drainage valve 24 the user disengages the valve opening and would then proceed to tilt the canister 9 upward about the ground contacting features 27. The tilt would shift the fluid contents of the first chamber 15 and second chamber 17 towards the drainage valve 24 at which point the fluid contents would be expelled from the canister 9.

In the present invention the leaf blower/vacuum 39 mounted to the leaf blower/vacuum mount 35 can be powered by various means. The present invention permits the attachment of leaf blowers/vacuums 39 that are gas powered or electric, having either a horizontally or vertically oriented air inlet 40. The electric leaf blowers/vacuums 39 can additionally be classified as being battery or corded. It should be noted that while the present invention is intended for use with a leaf blowers/vacuums 39, that it should be considered an obvious difference for the present invention to permit the attachment of a plurality of devices that function in a similar manner and can create enough suction to siphon animal waste into the canister 9. Devices that can be utilized in additional configurations of the present invention include but are not limited to various leaf blowers, vacuums, mulchers, and any combination thereof.

In the present invention the filter plate 16 is provided as an individual component that mounts to the interior of the canister 9 to prevent waste from passing between the canister 9 and into the leaf blower/vacuum 39. While the filter plate 16 primarily functions as a safety barrier that prevents large pieces of debris from being suctioned into the leaf blower/vacuum 39, it should be noted that the filter plate 16 be used to provide a barrier for finer pieces of debris. In this configuration the filter plate 16 can potentially utilize a fine dust filter to provide additional filtration. In this additional configuration of the present invention the first chamber 15 would not necessitate the use of the removable matter collection receptacle 21.

In the present invention the removable matter collection receptacle 21 configured as an air permeable bag 22 is held in place inside the first chamber 15 by being secured between the suction nozzle mount 10 and the nozzle canister mount 2. While this is the current method utilized to hold the air permeable bag 22 within the first chamber 15, alternative means to the hold the air permeable bag 22-can also be utilized as long as the component is found positioned within the first chamber 15.

In the present invention the removable matter collection receptacle 21 configured as an air permeable basket 23 is held in place by a mounting point found within the first chamber 15. While this is the current method utilized by the present invention to hold the air permeable basket 23 in place, an alternative means to the hold the component in place can also be utilized as long as the air permeable basket 23 is found within the first chamber 15.

In the present invention the nozzle latch 4 and the canister latch 12 function in combination as a straight loop latch. While this is the current type of latch used by the present invention, it should be noted that additional latching and fastening mechanisms can potentially be utilized to achieve the same function of securely coupling the suction nozzle assembly 1 to the canister 9.

In the present invention the visual indicator 8 is provided by the transparent construction of the nozzle 6. While the visual indicator 8 in the present invention is provided by the transparent construction of the nozzle channel 7, it should be noted that the function can potentially be accomplished by a mechanical or electrical component that would be able to detect the siphoning of the animal waste and then provide a visual cue to the user.

In the present invention the canister 9 attachment for leaf blower/vacuum 39 is intended for use in collecting animal waste. While the intended use of the present invention is for the collection of animal waste, it should be noted that the present invention can potentially be utilized as a collection device for various kinds of debris. The present invention can potentially be used to collect debris that can include but is not limited to, confetti, grass clippings, leaves, and various forms of debris as well as any combination thereof.

Although the invention has been explained in relation to its preferred embodiment, it is to be understood that many other possible modifications and variations can be made without departing from the spirit and scope of the invention as hereinafter claimed.

What is claimed is:

1. A canister attachment for leaf blowers/vacuums comprise,
   a suction nozzle assembly;
   a canister;
   a vertical support assembly;
   a suction duct;
   a leaf blower/vacuum;
   the suction nozzle assembly comprises a nozzle canister mount and a nozzle;
   the canister comprises a suction nozzle mount, a lateral surface, a first chamber, a removable matter collection receptacle, a filter plate, a second chamber, a suction duct mount, a duct opening, and at least one vertical support mount;
   the vertical support assembly comprises canister attachment features and ground contacting features;
   the suction duct comprises a duct canister mount, a leaf blower mount, and a duct channel;
   the leaf blower/vacuum comprises an air inlet and an exhaust opening.

2. The canister attachment for leaf blowers/vacuums as claimed in claim 1 comprises,
   the suction nozzle assembly being coupled adjacent to the canister;
   the vertical support assembly being adjacently attached to the canister;
   the suction duct being positioned between the canister and the leaf blower/vacuum;
   the suction duct being operatively coupled to the leaf blower/vacuum;
   the leaf blower/vacuum being securely fastened to the suction duct.

3. The canister attachment for leaf blowers/vacuums as claimed in claim 1 comprise,
   the nozzle canister mount being positioned adjacent to the suction nozzle mount, opposite the nozzle; and
   the nozzle channel traversing through the nozzle into the canister.

4. The canister attachment for leaf blowers/vacuums as claimed in claim 3 comprises,
   the nozzle canister mount comprises a nozzle hinge and a nozzle latch;
   the suction nozzle mount comprises a canister hinge and a canister latch;
   the nozzle hinge being pivotally coupled to the canister hinge; and
   the nozzle latch being operatively engaged to the canister latch.

5. The canister attachment for leaf blowers/vacuums as claimed in claim 3 comprises,
   the nozzle canister mount comprises a canister sleeve;
   the suction nozzle mount comprises a sleeve mount;
   the sleeve mount being concentric to the canister sleeve; and
   the canister sleeve encircling the sleeve mount, wherein the canister sleeve being of an appropriate inner diameter as to snugly fit over the sleeve mount forming an air tight seal.

6. The canister attachment for leaf blowers/vacuums as claimed in claim 3 comprises,
   the nozzle comprises a visual indicator; and
   the visual indicator being operatively coupled to the nozzle channel, wherein visual indicator relays information to a user regarding the presence of matter in the nozzle channel.

7. The visual indicator as claimed in claim 6 is constructed of a transparent material.

8. The canister attachment for leaf blower/vacuum as claimed in claim 1 comprises,
   each of the canister attachment features being positioned adjacent to at least one vertical support mount;
   the ground contacting features being positioned below the canister.

9. The canister attachment for leaf blowers/vacuums as claimed in claim 8 comprises,
   the ground contacting features comprise a wheel and axel assembly, wherein the wheel and axel assembly contact the ground and provide mobility to the canister attachment for the leaf blowers/vacuums.

10. The canister attachment for leaf blowers/vacuums as claimed in claim 8 comprises,
    the ground contacting features comprise a molded feature, wherein the molded feature contact the ground and provide the canister attachment for leaf blowers/vacuums a means to rest on the ground.

11. The canister attachment for leaf blowers/vacuums as claimed in claim 1 comprises,
    the filter plate being collinearly positioned between the first chamber and the second chamber;
    the first chamber, the filter plate, and the second chamber being encircled by the lateral surface;
    the removable matter collection receptacle being positioned within the first chamber;
    the suction nozzle mount being positioned adjacent to the first chamber; and
    the duct opening traversing through the lateral surface into the second chamber.

12. The removable matter collection receptacle as claimed in claim 11 comprises an air permeable bag.

13. The removable matter collection receptacle as claimed in claim 11 comprises an air permeable basket.

14. The canister attachment for leaf blowers/vacuums as claimed in claim 1 comprises,
    the canister comprises a drainage valve; and
    the drainage value being positioned adjacent to the second chamber, wherein the drainage valve provides a facilitated means to clean and remove fluid waste trapped in the first chamber and the second chamber.

15. The canister attachment for leaf blowers/vacuums as claimed in claim 1 comprises, the duct canister mount being positioned opposite the leaf blower/vacuum mount;

the duct channel traverses through the duct canister mount;

the duct canister mount being hermetically coupled to the suction duct mount;

the duct channel being coincident with the duct opening; and the leaf blower/vacuum being attached to the leaf blower/vacuum mount.

16. The canister attachment for leaf blowers/vacuums as claimed in claim 15 comprises;

the leaf blower/vacuum mount comprises an air passage the duct channel traverse through the air passage;

the air inlet being hermetically coupled to the air passage.

17. The canister attachment for leaf blowers/vacuums as claimed in claim 15 comprises;

the suction duct comprises a flexible duct assembly and a flexible duct mount;

the flexible duct mount being positioned between the leaf blower/vacuum mount and the duct canister mount;

the flexible duct mount traversing into the duct channel;

the flexible duct assembly being hermetically coupled to both the flexible duct mount and the air inlet.

18. The canister attachment for leaf blowers/vacuums as claimed in claim 15 comprises;

the leaf blower/vacuum mount comprises shaped structural features.

the leaf blower/vacuum being securely attached to the leaf blower/vacuum mount by way of the shaped structural features.

19. The canister attachment for leaf blowers/vacuums as claimed in claim 15 comprises;

the leaf blower/vacuum mount comprises hardware fasteners;

the leaf blower/vacuum being securely attached to the leaf blower/vacuum mount by way of the hardware fasteners.

20. The canister attachment for leaf blowers/vacuums as claimed in claim 1 comprises;

an exhaust catch;

the exhaust catch comprises an exhaust catch mount and an air permeable barrier;

the exhaust catch being mounted to the exhaust opening by way of the exhaust catch mount.

21. The canister attachment for leaf blowers/vacuums as claimed in claim 20 comprises;

the air permeable barrier comprises an air permeable fabric forming bag, wherein air permeable fabric forming bag allows air passage while block solid matter from passing through.

22. The canister attachment for leaf blowers/vacuums as claimed in claim 20 comprises;

the exhaust catch comprises an air permeable filter housing, wherein the air permeable filter housing comprises a filter medium positioned internally or externally.

* * * * *